UNITED STATES PATENT OFFICE.

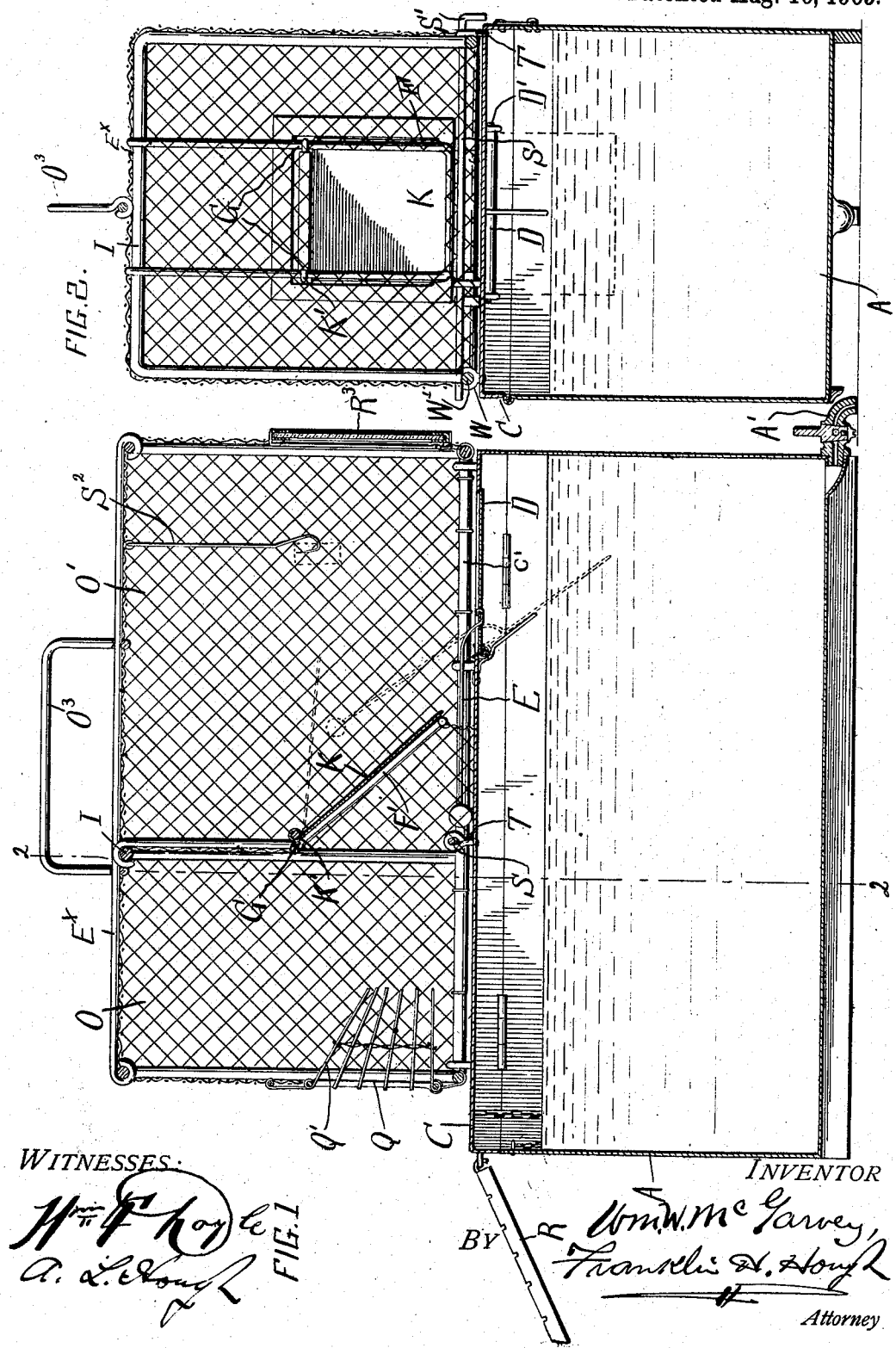

WILLIAM W. McGARVEY, OF CAPE GIRARDEAU, MISSOURI.

SELF-SETTING TRAP.

No. 930,558.   Specification of Letters Patent.   Patented Aug. 10, 1909.

Application filed January 5, 1909. Serial No. 470,882.

*To all whom it may concern:*

Be it known that I, WILLIAM W. MCGARVEY, a citizen of the United States, residing at Cape Girardeau, in the county of Cape Girardeau and State of Missouri, have invented certain new and useful Improvements in Self-Setting Traps; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.
This invention relates to new and useful improvements in self-setting traps and comprises various details of construction, combinations and arrangements of parts which will be hereinafter fully described and then specifically defined in the appended claim.

My invention is illustrated in the accompanying drawings, in which:—

Figure 1 is a vertical sectional view through the trap, and Fig. 2 is a cross sectional view on line 2—2 of Fig. 1.

Reference now being had to the details of the drawings by characters, A designates a tank adapted to contain water and having an exit spigot A'. C designates a closure which is hinged to said tank and is provided with an opening C'. D is a trap door having pintles D' which are journaled adjacent to the opposite marginal edges of said opening, and E designates a counter-balance arm projecting from said door adapted to normally hold the latter closed and allowing the door to tilt under the weight of an animal to be precipitated into the tank beneath. Mounted upon said closure is a cage $E^x$ having an aperture F therein, and F' designates a rod which is bent at angles at G, the ends of said rod being fastened to the cross rod I, forming a part of the partition within said cage. K is a door hinged upon a rod K', the ends of which are fastened to the upright portions of the rod F'. Said door K is adapted to close the U-shaped space intermediate the arms of the wire F' and serve to allow animals to pass from one compartment O to the other O', but so arranged as to prevent the animal passing back into the compartment O. Q designates an opening leading into the compartment O and having wires Q' about said opening so positioned as to make it difficult for an animal to escape having once entered said compartment O. R designates a bridge fastened to said closure and affords means whereby an animal can conveniently mount the tank and enter the cage. A handle $O^3$ is fastened to said cage and forms means for conveniently carrying the trap. Depending from the cage is a hook $S^2$ positioned over the trap door and adapted to hold a bait in such a position as to induce the animal to come upon the trap door, the weight of the animal causing the latter to tilt and precipitate the animal into the tank beneath, after which the trap door will automatically close by means of the counterbalance arm. One end of the trap is provided with an opening $R^3$, preferably covered with glass, afforded for a further means of inducing the animal to come toward said glass covered opening in its attempt to make escape, thereby coming upon the trap door. Fixed to the upper surface of said closure are the screw eyes T, and S designates a rod having one end S' bent at an angle. Said rod S is passed through the mesh work of the cage and also said eyes T as well as through the mesh work about the laterally projecting portion of the partition and serves to hold the cage which is hinged at W to the eyes W' locked to the closure. When said rod S is withdrawn from the position shown in the drawings, said cage may be allowed to swing back to give access to the interior of the same.

What I claim to be new is:—

A trap comprising a tank, a hinged closure therefor, registering eyes rising from the latter, a cage having a wire skeleton frame hinged at one edge to said closure, said cage having an open net work partition with an opening in an offset thereof, a rod passing through said cage and offset in the partition and bearing against the wire frame work and extending through said registering eyes upon said closure, as set forth.

In testimony whereof I hereunto affix my signature in the presence of two witnesses.

WILLIAM W. McGARVEY.

Witnesses:
ODE M. YARBROUGH,
EMIL A. MUEHLBACH.